(12) United States Patent
Beard et al.

(10) Patent No.: US 10,731,680 B2
(45) Date of Patent: Aug. 4, 2020

(54) FLOW DISTRIBUTER

(71) Applicant: Air BP Limited, Middlesex (GB)

(72) Inventors: Darren Beard, Middlesex (GB); Peter Robert William Pugh, Surrey (GB)

(73) Assignee: Air BP Limited, Middlesex (GB)

( * ) Notice: Subject to any disclaimer, the term of this patent is extended or adjusted under 35 U.S.C. 154(b) by 0 days.

(21) Appl. No.: 16/087,644

(22) PCT Filed: Mar. 27, 2017

(86) PCT No.: PCT/EP2017/057105
§ 371 (c)(1),
(2) Date: Sep. 22, 2018

(87) PCT Pub. No.: WO2017/162866
PCT Pub. Date: Sep. 28, 2017

(65) Prior Publication Data
US 2019/0093685 A1    Mar. 28, 2019

(30) Foreign Application Priority Data

Mar. 24, 2016    (GB) .................................. 1605184.9

(51) Int. Cl.
*F15D 1/02*      (2006.01)
*B03C 1/28*      (2006.01)
*B01D 46/00*     (2006.01)
*B01D 29/90*     (2006.01)
*F15D 1/04*      (2006.01)

(52) U.S. Cl.
CPC ............... *F15D 1/02* (2013.01); *B01D 29/90* (2013.01); *B01D 46/0041* (2013.01); *B03C 1/286* (2013.01); *F15D 1/04* (2013.01); *B01D 2201/44* (2013.01); *B03C 2201/18* (2013.01)

(58) Field of Classification Search
CPC ... F15D 1/02; F15D 1/04; B03C 1/286; B03C 2201/18; B01D 46/0041; B01D 29/90; B01D 2201/44
USPC ....... 210/459, 222, 247, 456, 437–439, 137, 210/446, 304–306, 420, 428
See application file for complete search history.

(56) References Cited

U.S. PATENT DOCUMENTS

| 4,136,018 A | 1/1979 | Clark et al. |
| 8,443,842 B2 | 5/2013 | Sonnenberg |
| 2010/0111718 A1* | 5/2010 | Schultz ............... F16H 57/0402 417/313 |
| 2012/0267294 A1* | 10/2012 | Herman ............... B01D 29/232 210/137 |

(Continued)

FOREIGN PATENT DOCUMENTS

| DE | 100 05 828 | 9/2001 |
| DE | 102010047782 | 1/2012 |
| FR | 2110770 | 6/1972 |

(Continued)

*Primary Examiner* — Madeline Gonzalez
(74) *Attorney, Agent, or Firm* — McDonnell Boehnen Hulbert & Berghoff LLP

(57) ABSTRACT

A flow distributor for a fluid flow entering a deceleration vessel from an inlet conduit comprises a plurality of spaced vanes arranged extending substantially parallel to each other across a width of the distributor and being angled from the upstream to the downstream end so as to form flow channels therebetween to direct flow outwardly away from a central portion of the distributor.

18 Claims, 6 Drawing Sheets

(56) References Cited

U.S. PATENT DOCUMENTS

2019/0099762 A1   4/2019   Beard et al.

FOREIGN PATENT DOCUMENTS

| GB | 2425971 | 11/2006 |
|----|---------|---------|
| WO | WO 2014/105067 | 7/2014 |

* cited by examiner

FLOW DISTRIBUTER

CROSS REFERENCE TO RELATED APPLICATION

This application is a National Phase application of, and claims the benefit of, International (PCT) Application No. PCT/EP2017/057105, filed Mar. 24, 2017, which claims priority to GB Patent Application No. 1605184.9, filed Mar. 24, 2016, each of which is hereby incorporated by reference in its entirety.

This invention relates to a flow distributor for creating an even flow across an area of a vessel such as a filtration vessel provided in a pipeline.

Fuel such as aviation fuel being delivered to a fuel delivery facility, for example at an airport, may contain contaminants, for example rust particles, from the pipeline or from transport storage such as the hold of a ship. Therefore it is required to filter such fuel before it is dispensed for use.

Fuel filters usually take the form of filtering units or filter material provided in the flow path for collecting contaminants in the flow. Filters are usually provided in a deceleration vessel or larger diameter section of the pipeline, where the flow rate is reduced. This is in order to provide effective filtering by trapping and holding particles by mesh, fibres, magnetic field or other means. The restriction to flow caused by the filter media must also be considered as this may cause a differential pressure across the unit. Managing this differential pressure within appropriate limits is important to ensure the media is not damaged or otherwise fails, as damaged filter units of filter units that may have otherwise failed may permit the contaminants that were to be removed to flow downstream and contaminate tanks or even potentially end up in the end-use equipment. Thus, increasing the available area of the filtering means for fuel to pass through can allow the fuel flow through the system to be maintained with a minimum pressure differential across the filtering means.

An example of a type of filter is a magnetic filter which may comprise a plurality of magnetic rods extending across the flow direction in a deceleration vessel or pipe section. The magnetic rods provide a magnetic field which attracts magnetically susceptible particles entrained in the flow, which then adhere to the rods through the magnetic attractive forces. If the flow rate past the rods is too high, the filtration (i.e. removal of the particles from the fluid flow) is less effective as faster flowing particles cannot diffuse to the magnetic rods sufficiently quickly to be held by the stronger field close to the magnetic rods or cores therein. Furthermore, a turbulent or increased flow rate can act to displace particles from the rods back into the flow, decreasing the filter efficiency. It is therefore preferable that a high speed flow is decelerated in the area of the magnetic filter. The magnetic filter is therefore provided in a vessel having a larger cross-sectional area than the inlet from the pipeline. The increase in cross-section must also take into account the area presented by the magnetic rods, as these can otherwise serve to restrict flow and be detrimental to operation.

To ensure maximum usage of filtration elements, either magnetic rods or conventional filter elements, an even flow across the entire area of the filtration element is preferable. In a high flow rate environment such as a fuel line, a relatively large change of cross sectional area may be required to decelerate the flow sufficiently for effective filtration, and it can be difficult to achieve an even flow rate across the larger area, and this problem is exacerbated in situations where the available space to situate the vessel is limited as it restricts the available area to provide a gradual increase in cross-section of the pipeline.

The invention aims to alleviate or reduce at least some of these problems.

The invention broadly provides a flow distributor, which may be used individually or in multiple units, for facilitating an even velocity profile in a fluid flowing in a flow channel where the area of the channel increases, and in particular where the area increases more in one dimension than the other. For example, this may be the case when flow enters a cylindrical deceleration vessel from a pipe.

According to the present invention, there is provided a flow distributor for a fluid flow entering a deceleration vessel, the distributor having an upstream end in an inlet channel and a downstream end in the deceleration vessel, and comprising a plurality of spaced vanes arranged extending substantially parallel to each other across a width of the distributor and being angled from the upstream to the downstream end so as to form flow channels therebetween to direct flow outwardly away from a central portion of the distributor.

Depending upon the system in which the deceleration vessel is to be used, the deceleration vessel may comprise a pressure vessel. In one particular embodiment wherein the deceleration vessel is connected to a fuel pipeline, the deceleration vessel is a pressure vessel.

Thus the flow can expand with a substantially even velocity, particularly when the flow expands more in one dimension than the other. For example the flow entering a deceleration vessel may pass through the distributor and expand to a substantially even velocity flow across a filter element having a cross section which is larger than the cross section of the inlet conduit, in particular in a direction perpendicular to the flow channels formed by the vanes, and is contained within a larger vessel connected to the inlet conduit. For example, the flow velocity may be substantially uniform across at least the central part of the conduit; i.e. across at least 50% or 70%, or preferably across at least 80% or 90% of the conduit The flow channels are preferably substantially parallel when viewed in cross-section with respect to the flow direction. Preferably, a space between adjacent vanes forming a flow channel expands from the upstream to the downstream end. In particular, the channels may be angled progressively more steeply from a central portion of the distributor to each edge thereof. Preferably, the vanes are curved in shape, for example with the radius of curvature increasing from the centre portion to each edge portion of the distributor. There may be between approximately 4 and 30 vanes, or between 6 and 20 vanes, and preferably 10 to 12 vanes, depending on the design requirement.

The distributor is preferably formed of a material which is inert to the fluid being filtered; for example steel or, more preferably in the case of magnetic filter units, stainless steel.

The invention also provides a filter system for a pipeline comprising a pressure vessel and an inlet conduit for the pressure vessel, the pipeline communicating with the inlet conduit, and a distributor as defined above. The pipeline may be connected to the inlet conduit such that the flow axis of the pipeline is substantially perpendicular to the axis of the inlet conduit. Preferably the inlet conduit has a closed end opposite the pressure vessel, and the pipeline is connected to an elbow section for directing flow towards the closed end. This assists with creating an even flow at the inlet of the distributor.

The system may comprise at least one further flow distributor, which may be a distributor as defined above or a distributor of a different design. This may allow the footprint of the vessel or system to be reduced. Where a further distributor is used, it is preferably mounted upstream of the distributor of the invention, for example within 2 metres, 1 metre, or preferably within 0.5 metres of the change in area, or the transition from the inlet conduit to the pressure vessel.

The invention will now be described by way of example with reference to the accompanying drawings, in which.

Figure 1:
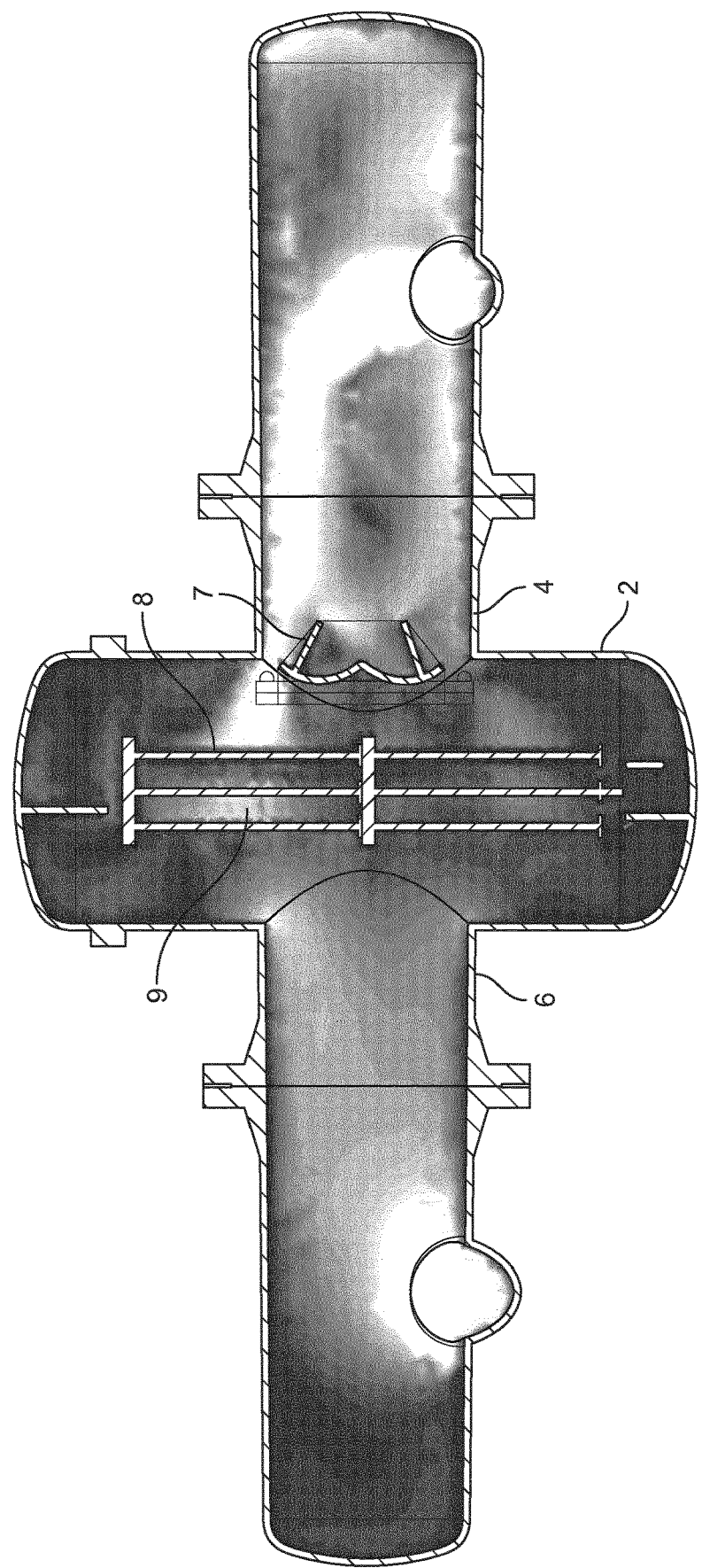
FIG. 1 is an illustration of the flow velocity profile in a pressure vessel without a diffuser according to the present invention.

Referring to FIG. 1, a filter arrangement is shown for connecting to a pipeline, such as a high pressure pipeline for transporting fuel. The figure uses computer aided design and computational fluid dynamics modeling, as is known in the art, to show different flow velocities given by a colour gradient, with the lighter shade representing the areas of highest velocity and the darker shades representing the areas of lowest velocity. The arrangement comprises a deceleration vessel 2, which is substantially cylindrical and is connected on one side to an inlet pipe 4 and on the other side to an outlet pipe 6 facing each other across the vessel and extending substantially perpendicular thereto. The vessel 2 contains a magnetic filter 8 which is substantially rectangular and extends across the vessel between the inlet and outlet such that fluid flowing through the vessel passes across the magnetic filter 8.

Figure 4:
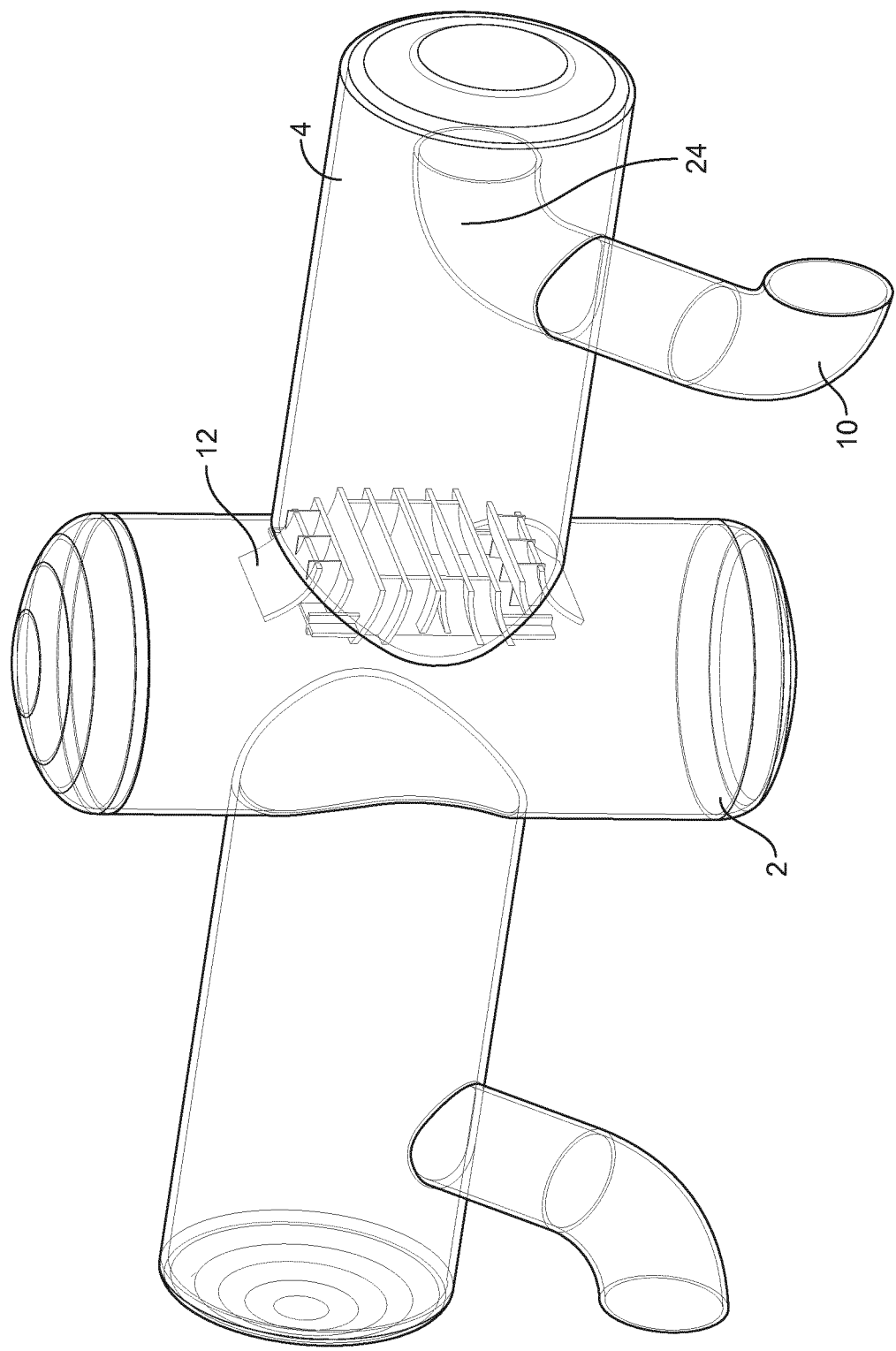
FIG. 4 is a perspective view of a pressure vessel including a diffuser according to the embodiment of FIG. 2.

The inlet and outlet pipes 4, 6 may be connected to the pipeline by means of an external elbow section 10 (see FIG. 4). The inlet and outlet pipes 4, 6 are of a larger diameter than the main pipeline to which it is connected (not shown), such that flow entering the inlet pipe 4 from the main pipeline decelerates. The inlet pipe 4 is of smaller diameter than the vessel 2, such that the fluid flow expands and decelerates further on entering the vessel and passing over the filter 8. In FIG. 1, a simple two vane flat plate diffuser 7 is provided between the inlet 4 and the vessel 2.

It is preferable that the flow has a substantially even velocity across the area of the magnetic filter 8; as can be seen from FIG. 1, it has been found that with the arrangement above described, the flow is unbalanced, in particular with a higher flow rate being experienced over an area 9 at the top of the magnetic filter 8 compared to the flow rate being experienced over the bottom half of the magnetic filter. This results in the magnetic filter 8 being less effective since the uneven flow rate causes an uneven build-up of particles on the magnetic filter 8, and thus the flow rate cannot be optimized over all the magnetic filter 8. The simple two vane flat plate diffuser has therefore been found to be ineffective. This finding has been verified by operation of such a system.

Figure 2:
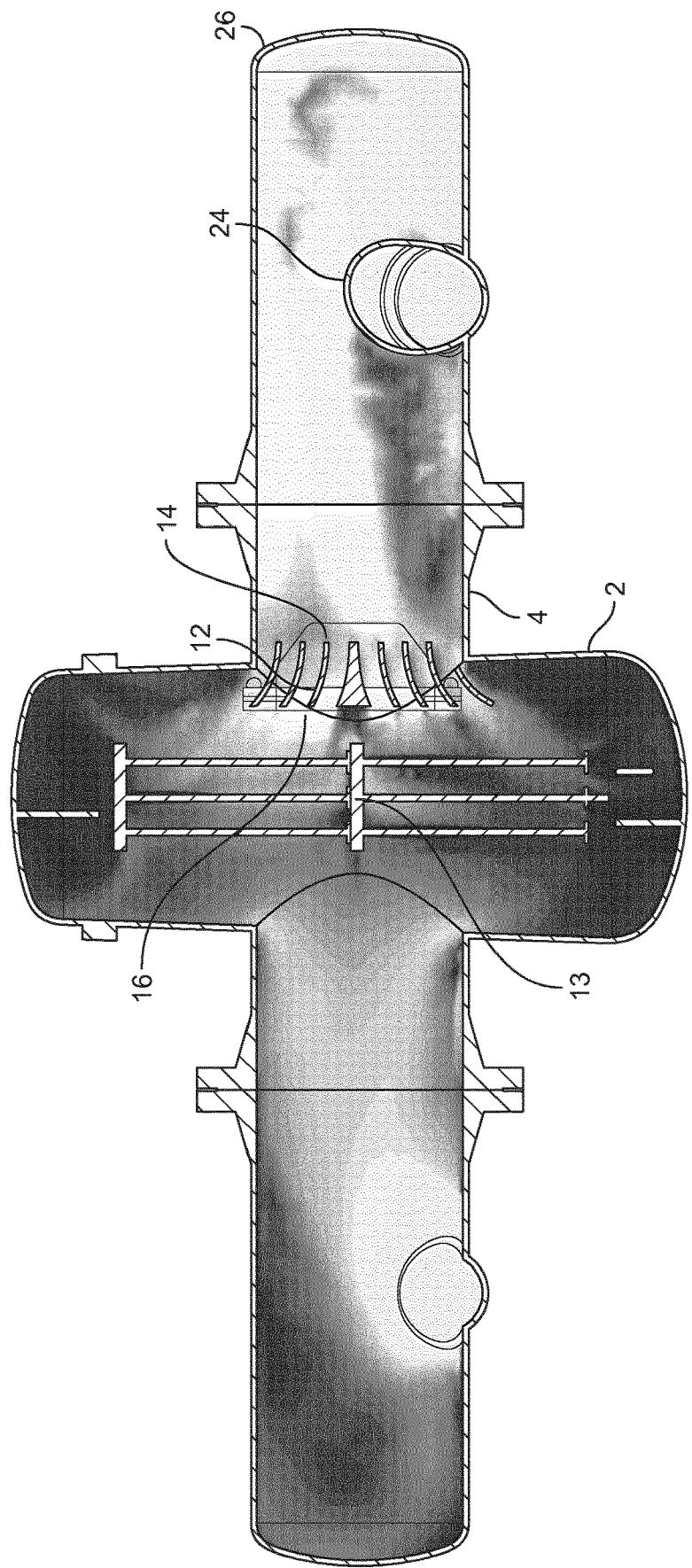
FIG. 2 is an illustration of the flow velocity profile in a pressure vessel having a flow diffuser according to an embodiment of the present invention.
Figure 3:
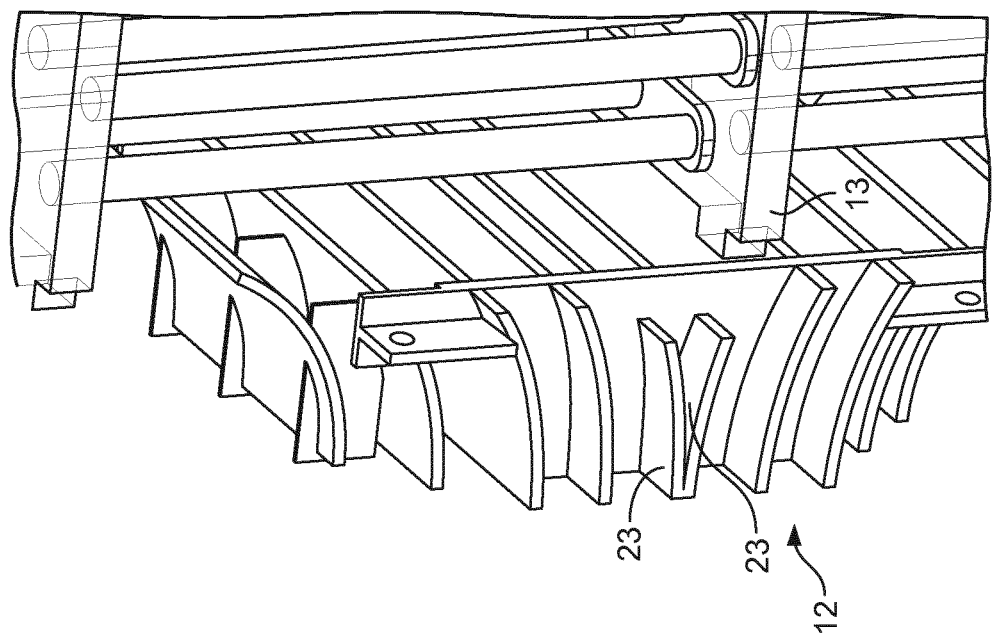
FIG. 3 is shows a two stage diffuser according to an alternative embodiment of the present invention.
Figure 3:
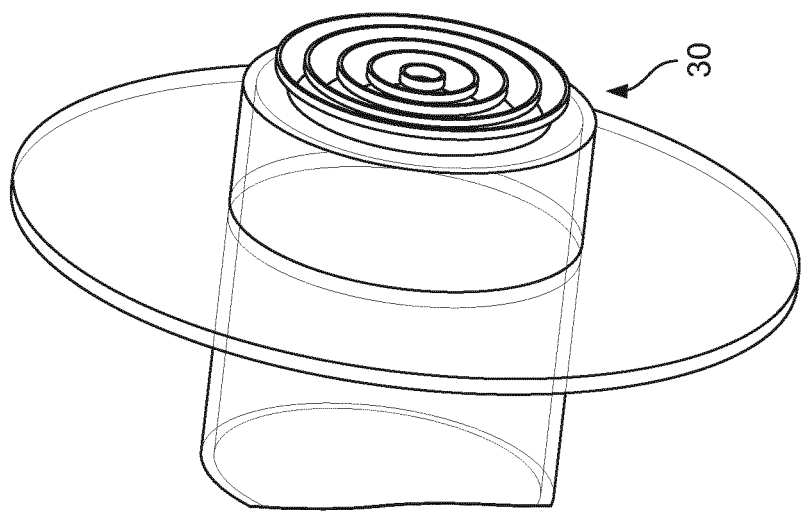
Figure 8:
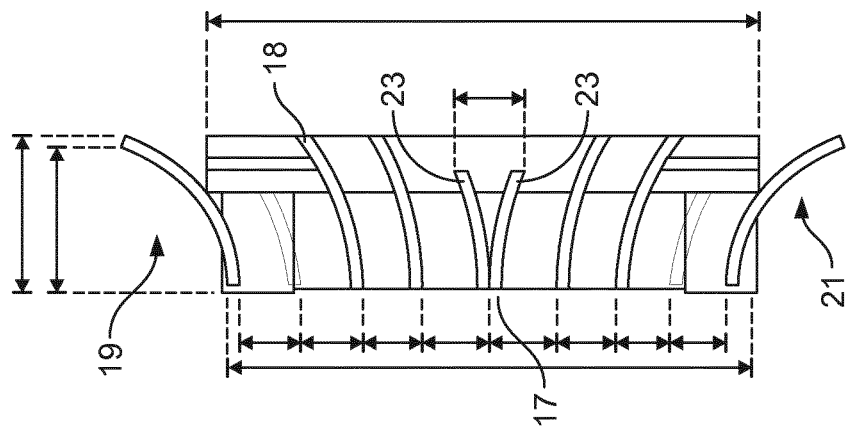
FIG. 8 is a cross sectional side view of the diffuser of FIG. 6.
Figure 7:
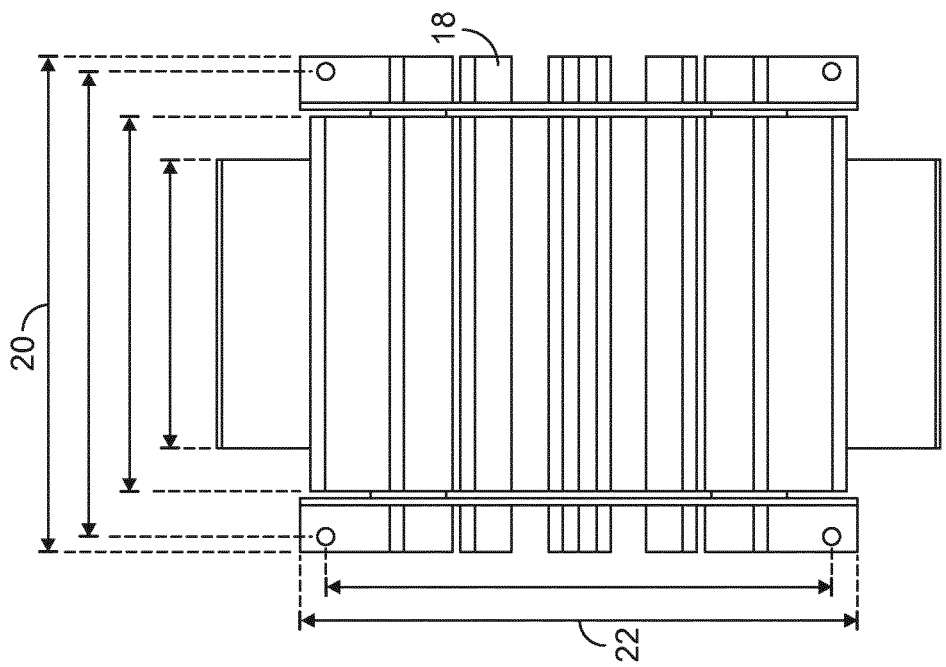
FIG. 7 is a front view of the diffuser of FIG. 6.
Figure 6:
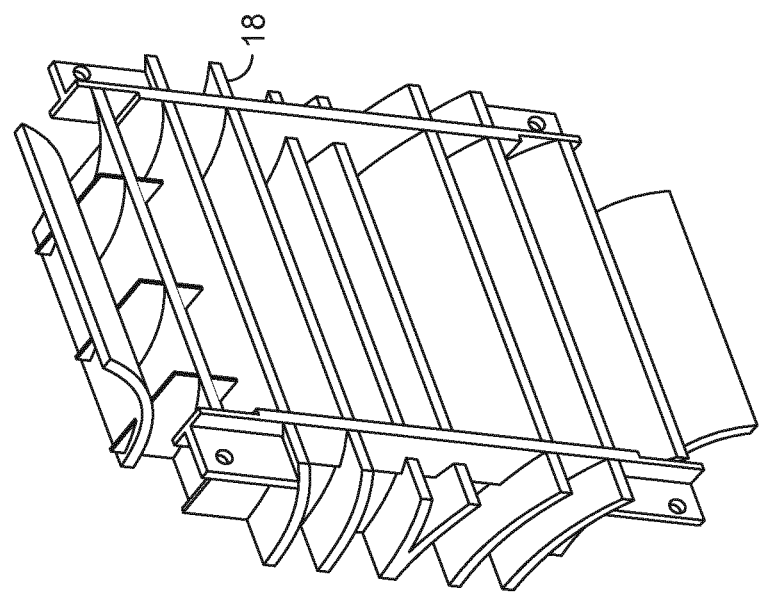
FIG. 6 is a perspective view of a diffuser according to an embodiment of the present invention.

Referring now to FIG. 2, a filter arrangement is shown for connecting to a pipeline, such as a high pressure pipeline for transporting fuel. The figure uses computer aided design and computational fluid dynamics modeling, as is known in the art, to show different flow velocities given by a colour gradient, with the lighter shade representing the areas of highest velocity and the darker shades representing the areas of lowest velocity. The arrangement comprises a distributor 12 according to the invention is placed between the inlet pipe 4 and the vessel 2, with an upstream end 14 thereof in the inlet pipe 4 and a downstream end 16 thereof in the vessel 2. A magnetic filter is contained within the vessel 2. The distributor 12, shown in more detail in FIGS. 6, 7 and 8, comprises a plurality of vanes 18 which are substantially parallel across a width 20 of the distributor 12, and which curve away from each other upwardly and downwardly. The vanes 18 are substantially part-circular curves, which have a decreasing radius from the centre vanes 17 to the vanes at the top 19 and bottom 21 edges of the diffuser 12. In FIG. 2, it can be seen from this model that the distributor acts to direct the flow such that flow exiting the distributor has a significantly more even velocity over the area of the magnetic filter compared to the flow over the magnetic filter observed in FIG. 1, with the flow velocities across the full height of the magnetic filter being similar. This finding has also been verified by operation.

A particular preferred feature of the diffuser design shown is that two or more diverging diffuser blades are joined at the upstream end to preferentially direct flow. As illustrated in FIGS. 2 to 6, in this example the two centre diffuser blades 23 are joined in this way. This is to provide smooth flow over the center plate 13 of the magnetic filter seen at the centre of the decelerator vessel in FIG. 2. This configuration alleviates the problem of flow impacting the central plate and creating turbulence, which may reduce the effectiveness of the magnetic rods in this vicinity. Other pairs of diffuser blades may be connected in a similar manner to ensure smooth flow around filter parts downstream which may cause turbulence and so reduce efficiency.

In the case illustrated in FIGS. 2 and 4, an internal short radius elbow 24 is connected to the external elbow 10, such that flow entering the inlet pipe section 4 from the pipeline is directed backwardly towards a closed end 26 of the inlet pipe 4. It has been found that this assists in creating a more even flow entering the distributor 12 and thus enhances the function of the distributor to create an even flow in the vessel. This arrangement is also shown in FIG. 4.

The distributor of the invention can be used individually, or in multiple units such as 2, 3, 4 or more distributors, or in conjunction with one or more known types of diffuser, such as 1, 2, 3, 4 or more.

Figure 5:
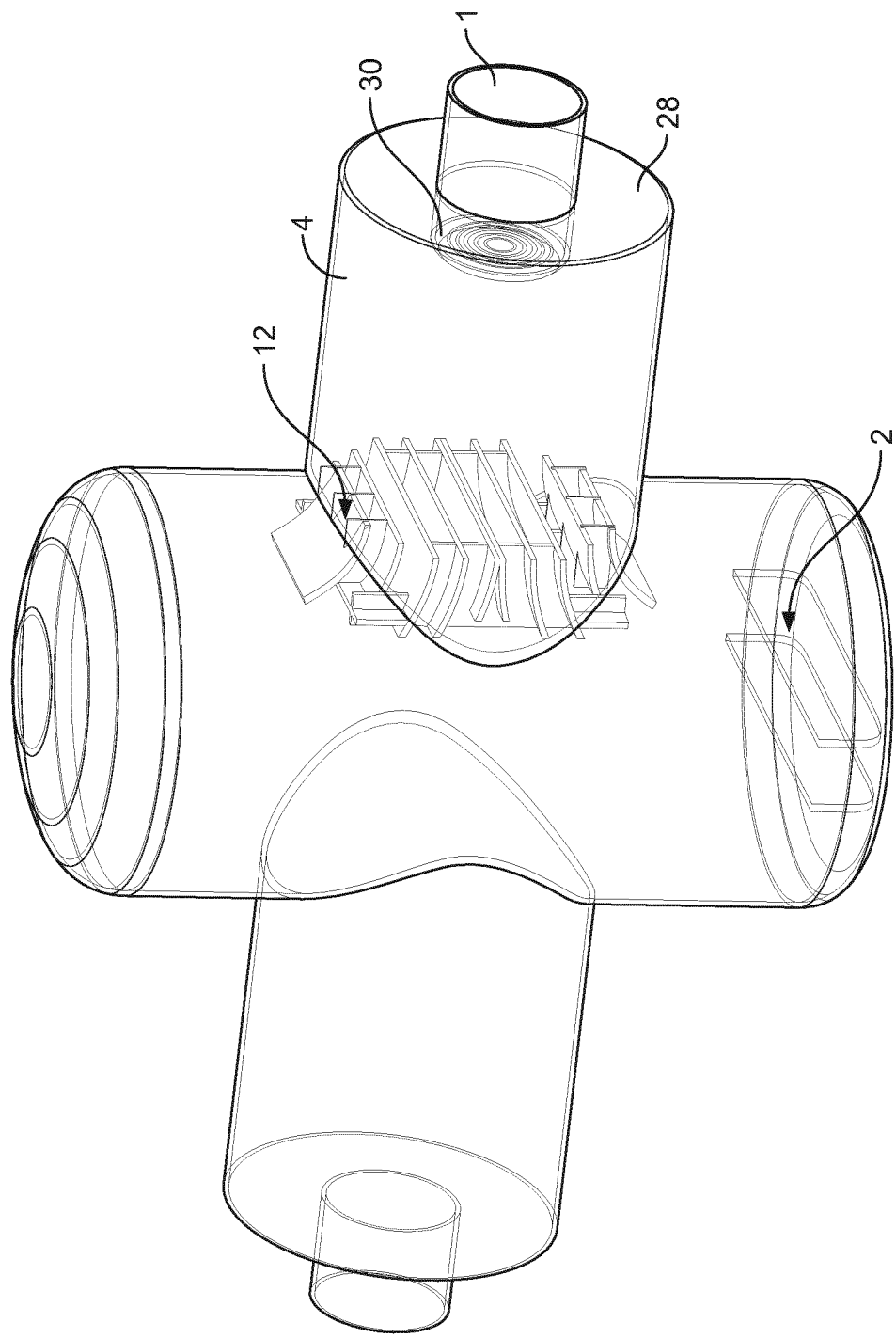
FIG. 5 is a perspective view of a pressure vessel including diffusers according to the embodiment of FIG. 3.

An alternative arrangement is shown in FIG. 5, in which the pipeline 1 is connected in line to the end face 28 of the inlet pipe 4 to reduce the footprint of the filter system. In this case, a second diffuser 30 of a known type may be provided, as can be seen in more detail in FIG. 3. The second diffuser comprises concentric circular vanes which are angled away from each other so as to direct the flow outwardly of the pipe in a substantially even fashion where the diameter of the pipe increases. This also presents a more even flow to the diffuser 12 to enhance its operation.

The invention claimed is:

1. A magnetic filter system for a pipeline, the magnetic filer system comprising:

a pressure vessel having an inlet conduit, the pipeline communicating with the inlet conduit;

a magnetic filter in the pressure vessel; and a flow distributor for a fluid flow, the flow distributor having an upstream end in the inlet conduit and a downstream end in the pressure vessel, and comprising a plurality of spaced vanes arranged extending across a width of the flow distributor and being angled from the upstream end to the downstream end so as to form substantially parallel flow channels therebetween to direct the fluid flow outwardly away from a central portion of the flow distributor, in which at least two spaced vanes of the plurality of spaced vanes are joined at respective upstream ends and diverge towards respective downstream ends so as to direct flow away from a region between the downstream ends of the at least two spaced vanes.

2. A magnetic filter system as claimed in claim 1, in which the flow channels expand in depth from the upstream end to the downstream end of the flow distributor.

3. A magnetic filter system as claimed in claim 1, in which the flow channels are angled progressively more steeply from the central portion of the flow distributor towards each edge thereof.

4. A magnetic filter system as claimed in claim 1, in which each of the spaced vanes of the plurality of spaced vanes are curved in shape.

5. A magnetic filter system as claimed in claim 4, in which the radius of curvature of each of the spaced vanes of the plurality of spaced vanes increases from the central portion of the flow distributor to each edge thereof.

6. A magnetic filter system as claimed in claim 1, in which there are between 8 and 20 spaced vanes in the plurality of spaced vanes.

7. A magnetic filter system as claimed in claim 1, in which the pipeline is connected to the inlet conduit such that an axis of the pipeline is substantially perpendicular to an axis of the inlet conduit.

8. A magnetic filter system as claimed in claim 1, in which the inlet conduit has a closed end opposite the pressure vessel, and the pipeline is connected to an elbow section of the inlet conduit for directing the fluid flow towards the closed end.

9. A magnetic filter system as claimed in claim 1, in which the pipeline is substantially coaxial with the inlet conduit, and the magnetic filter system comprising at least one further flow distributor disposed upstream of the flow distributor.

10. A magnetic filter system as claimed in claim 9, comprising a diffuser between the pipeline and the inlet conduit.

11. A magnetic filter system as claimed in claim 1, in which the pressure vessel has a larger cross-sectional area than the inlet conduit.

12. A magnetic filter system as claimed in claim 11, in which the inlet conduit has a larger cross-sectional area than the pipeline.

13. A magnetic filter system as claimed in claim 11, in which the fluid flow passes through the flow distributor such that the fluid flow expands to a substantially even velocity flow across the magnetic filter, and the magnetic filter has a larger cross-sectional area than the inlet conduit.

14. A magnetic filter system as claimed in claim 11, in which the cross-sectional area of the magnetic filter is in a direction perpendicular to the flow channels.

15. A magnetic filter system as claimed in claim 1, in which the magnetic filter comprises a first end, a second end, and a center plate disposed between the first end and second end, and the center plate is aligned with the central portion of the flow distributor.

16. A magnetic filter system as claimed in claim 15, in which the at least two spaced vanes are aligned with the center plate so as to direct flow outwardly away from the center plate.

17. A magnetic filter system for a pipeline, the magnetic filer system comprising:

a pressure vessel having an inlet conduit, the pipeline communicating with the inlet conduit, wherein the inlet conduit has a larger cross-sectional area than the pipeline;

a magnetic filter in the pressure vessel, wherein the magnetic filter has a larger cross-sectional area than the inlet conduit, and wherein the pressure vessel has a larger cross-sectional area than the magnetic filter; and a flow distributor for a fluid flow, the flow distributor having an upstream end in the inlet conduit and a downstream end in the pressure vessel, and comprising a plurality of spaced vanes arranged extending across a width of the flow distributor and being angled from the upstream end to the downstream end so as to form substantially parallel flow channels therebetween to direct the fluid flow outwardly away from a central portion of the flow distributor and toward the magnetic filter, wherein the cross-sectional area of the magnetic filter is in a direction perpendicular to the flow channels, in which the plurality of spaced vanes comprise two spaced vanes disposed at the central portion of the flow distributor, and the two spaced vanes are joined at respective upstream ends and diverge towards respective downstream ends so as to direct flow away from a region between the downstream ends of the two spaced vanes.

18. A magnetic filter system as claimed in claim 17, in which the magnetic filter comprises a center plate, and the two spaced vanes are aligned with the center plate so as to direct flow outwardly away from the center plate.

* * * * *